United States Patent
Borowiak, Jr. et al.

(10) Patent No.: US 12,024,593 B2
(45) Date of Patent: Jul. 2, 2024

(54) METHOD OF MAKING AN ACID NEUTRALIZING POLYMER THROUGH REACTIVE COMPOUNDING

(71) Applicant: Workers First LLC, Pittsburgh, PA (US)

(72) Inventors: Matthew James Borowiak, Jr., Buffalo, NY (US); Richard Earl Partch, Hannawa Falls, NY (US); David Geraint Roberts, Sheboygan Falls, WI (US)

(73) Assignee: Workers First LLC, Pittsburgh, PA (US)

( * ) Notice: Subject to any disclaimer, the term of this patent is extended or adjusted under 35 U.S.C. 154(b) by 60 days.

(21) Appl. No.: 17/692,856

(22) Filed: Mar. 11, 2022

(65) Prior Publication Data

US 2022/0289910 A1    Sep. 15, 2022

Related U.S. Application Data

(60) Provisional application No. 63/160,291, filed on Mar. 12, 2021.

(51) Int. Cl.
    *C08G 69/48*      (2006.01)
    *C08K 3/22*      (2006.01)
    *C08K 5/057*      (2006.01)

(52) U.S. Cl.
    CPC ............... *C08G 69/48* (2013.01); *C08K 3/22* (2013.01); *C08K 5/057* (2013.01); *C08K 2003/2206* (2013.01)

(58) Field of Classification Search
    CPC ................................ C08G 69/48; C08L 77/00
    See application file for complete search history.

(56) References Cited

U.S. PATENT DOCUMENTS

| | | | |
|---|---|---|---|
| 4,824,881 A * | 4/1989 | Kim | .............. C08G 69/48 524/84 |
| 5,310,824 A | 5/1994 | Burch et al. | |
| 8,709,466 B2 | 4/2014 | Coady et al. | |
| 11,078,331 B2 | 8/2021 | Borowiak et al. | |
| 2009/0163642 A1 | 6/2009 | Kiss et al. | |
| 2021/0324140 A1 | 10/2021 | Borowiak, Jr. et al. | |

FOREIGN PATENT DOCUMENTS

WO    2022/192677    9/2022

OTHER PUBLICATIONS

Kim, Harry, "PCT International Search Report and Written Opinion of the International Searching Authority", PCT International Application No. PCT/US2022/019965 filed on Mar. 11, 2022, mailed on Jun. 9, 2022, United States Patent and Trademark Office, Alexandria, VA (6 pages).

Swar Sumita et al., Importance and Necessity of the Surface Modification of Nylon 6 Films for Future Biomedical Application, Nanocon, Oct. 21, 2016, retrieved on May 10, 2022 from: https://www.confer.cz/nanocon/2016/425-importance-and-necessity-of-the-surface-modification-of-nylon-6-films-for-future-biomedical-application, pp. 663-668.

Jia Xinqiao et al., Nylon Surface modification. Part 1. Targeting the amide groups for selective introduction of reactive functionalities, Polymer, vol. 47, Issue 14, Jun. 28, 2006, retrieved on May 10, 2022 from: https://www.sciencedirect.com/science/article/abs/pii/S0032386106006355, abstract, 4 pages.

Kuroda, et al.; "Non-aqueous, zwitterionic solvent as an alternative for dimethyl sulfoxide in the life sciences"; Communications Chemistry. Nov. 11, 2020. vol. 3, pp. 1-7; p. 1; Abstract.

Rodriquez, Karl, "International Search Report and Written Opinion"; mailed Jan. 9, 2024 for Application No. PCT/US/23/72005; The International Searching Authority / United States; Alexandria, Virginia.

* cited by examiner

*Primary Examiner* — Brieann R Johnston
(74) *Attorney, Agent, or Firm* — Woods Oviatt Gilman LLP; Dennis B. Danella, Esq.

(57) ABSTRACT

A method of making an acid neutralizing polymer includes: a) preparing a first reaction mixture by blending of a polyamide material, a solid strongly basic material, and a halogenated-dimethylalkylamine; b) adding the first reaction mixture to a first compounding machine; c) reacting the first reaction mixture for a time and at a temperature sufficient to produce a first reaction product; d) preparing a second reaction mixture including the polyamide material; e) adding the second reaction mixture to a second compounding machine; f) reacting the second reaction mixture for a time and at a temperature sufficient to produce a second reaction product; g) preparing a third reaction mixture by blending the first reaction mixture and the second reaction mixture; h) adding the third reaction mixture to a third compounding machine; and i) reacting the third reaction mixture for a time and at a temperature sufficient to produce the acid neutralizing polymer.

16 Claims, 3 Drawing Sheets

METHOD OF MAKING AN ACID NEUTRALIZING POLYMER THROUGH REACTIVE COMPOUNDING

CROSS-REFERENCE TO RELATED APPLICATIONS

This application claims the benefit of U.S. Provisional Application No. 63/160,291, filed Mar. 12, 2021, entitled METHOD OF MAKING AN ACID NEUTRALIZING POLYMER THROUGH REACTIVE EXTRUSION, the entirety of which is incorporated herein by reference.

STATEMENT REGARDING FEDERALLY SPONSORED RESEARCH OR DEVELOPMENT

This invention was made with Government support under Award Number (FAIN) 2051796 awarded by the National Science Foundation. The Government has certain rights in the invention.

TECHNICAL FIELD

The present invention relates to a method of making an acid neutralizing polymer, and more particularly to a method of making an acid neutralizing polymer using reactive compounding technology, and even more particularly to a method of making an acid neutralizing polymer through reactive extrusion.

BACKGROUND OF THE INVENTION

Polyamides, including nylon 6, nylon 6,6 (nylon 66) and nylon 12, are synthetic polymers amenable to functionalization through chemical modification of the amide groups within the polymer backbone. Nylon fabrics have been modified to increase their tensile strength for military application or modified to improve dye acceptance. In U.S. Pat. No. 11,078,331, the entirety of which is incorporated by reference herein, a process is described to create an acid neutralizing powder through a reaction in dimethyl formamide (DMF). This process has the disadvantage of providing only a low yield and hence the reacted product is limited in the extent to which it can provide the required acid neutralization properties. Additionally, the process by products (butanol from the reaction and DMF vapor from the drying step) may be difficult to handle from an environmental perspective.

Thus, what is needed is an acid neutralizing polymer with high amide modification produced through a solvent-less method while also using less hazardous starting reagents and yielding more environmentally friendly and less hazardous waste materials. The present invention addresses this, as well as other, needs.

SUMMARY OF THE INVENTION

Acid Neutralizing Polymer Reaction (ANPR) is a method of creating an acid neutralizing polymer that can be used to generate both powder and resin in order to serve the Acid Proof Coatings & Lining market and Personal Protection Equipment (PPE) market. These powders can be added to floor coatings and also made into floor mats to protect equipment and personnel by neutralizing acids on contact. Products manufactured with this technology exceed the performance of corrosion resistant materials such as PVC, PTFE, phenolic epoxy, and rubber floor mats through a combination of acidic corrosion resistance and acid neutralization. In addition, these polymers can be used to neutralize acids multiple times by refreshing them via a proprietary reactivation solution.

The technology involves reacting an amino nylon polymer, with two additional chemicals within a polymer compounding process such as a twin-screw extruder, internal mixer (e.g., BANBURY), continuous mixer (e.g., FARREL Continuous Mixer) or a reciprocating single screw compounding machine (e.g., BUSS KO Kneader). The reaction involves the melt mixing of the ingredients using an optimized set of process conditions which provide the necessary temperature of reaction, residence time and degree of shear induced dispersion.

An advantage of the new reactive compounding process is that it is possible to generate a much higher yield of the reacted final product. During the reactive compounding process, the reactions take place when the polymer is in the molten state and is undergoing intensive dynamic shear. This allows for intimate mixing of the reactants and optimal reaction yield by controlling temperature (which affects reaction rate) and residence time (which affects the extent of reaction).

In accordance with an aspect of the present invention, the reactive compounding can be accomplished in three steps. In the first step, amino nylon is blended with a halogenated-dimethylalkylamine such as 2-chloro-N,N-dimethylethylamine hydrochloride, an acid neutralizing compound such as calcium carbonate, and a heat stabilizer suitable for nylon such as BRUGGOLEN H10 available from L. Brüggemann GmbH & Co. KG, Heilbronn, Germany. The first step of the reaction neutralizes the 2-chloro-N,N-dimethylethylamine hydrochloride. The second step involves reacting additional amino nylon with calcium hydroxide and a heat stabilizer suitable for nylon, the heat stabilizer may be the same or different than the heat stabilizer using in the first step. The second step generates anionic nitrogen atoms for reaction in the third step. The third step involves the combination of the reaction products generated in the first and second steps to produce the final product. Depending on the particular melt compounding process used, the final product can be produced in multiple steps or in either 2 or 1 steps.

BRIEF DESCRIPTION OF THE DRAWINGS

The accompanying drawings form a part of this specification and are to be read in conjunction therewith, wherein like reference numerals are employed to indicate like parts in the various views, and wherein.

DETAILED DESCRIPTION

Polyamides, such as but not limited to nylon 6, nylon 66 and nylon 12 may be modified through base-induced removal of the amido hydrogen to generate a reactive nitrogen atom within the polyamide backbone. In accordance with an aspect of the present invention, the nitrogen reacts with a basic compound, such as an amine, to bond a basic pendant group to the polyamide chain. This basic pendant group is then free to neutralize any hydrogen ions which come into contact with modified nylon.

Figure 1:
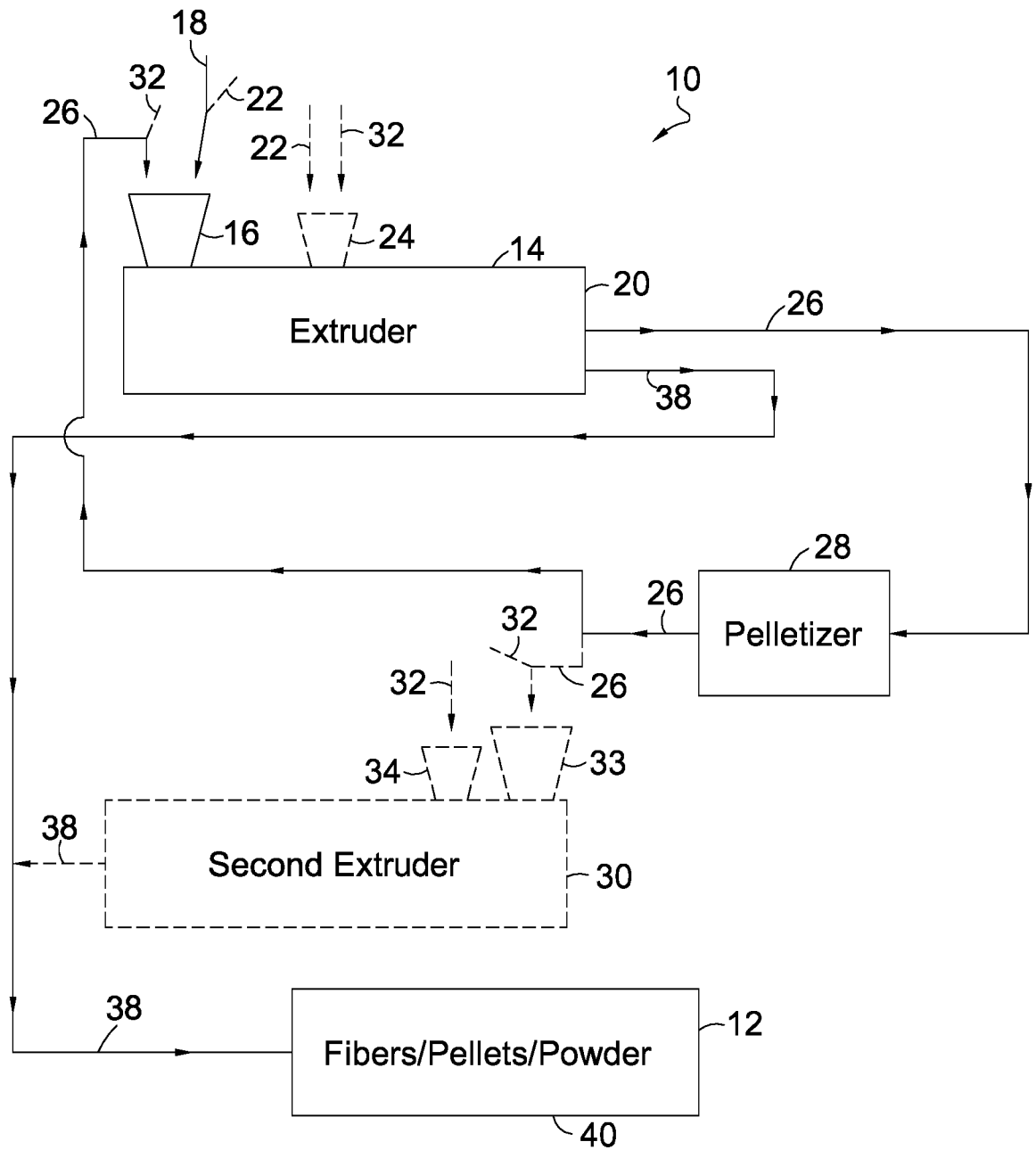
FIG. 1 is a schematic of an exemplary system for producing acid neutralizing polyamide in accordance with the present invention.

Turning now to FIG. 1, an exemplary system 10 for producing an acid neutralizing polymer end product 12 generally includes at least one compounding machine 14. In accordance with an aspect of the invention, the reaction can be realized in a suitable melt compounding process. Compounding machine 14 may include one or more of a twin-screw extruder, an internal mixer such as a BANBURY mixer or similar, a continuous mixer such as a FARREL Continuous Mixer or similar, or a reciprocating single screw compounding machine such as a BUSS KO Kneader or similar. In one exemplary embodiment, compounding machine 14 is a twin screw extruder. Twin-screw compounding has significant flexibility to vary temperature, residence time and order of addition of ingredients. Twin-screw compounding extruders are often modular in design and the machines can be configured to allow for addition of ingredients at different positions along the length of the barrel through entry points know as side feeding sections. Additionally, the screw designs can be easily configured to create specific functions along the length of the machine including sections for conveying, melting, mixing, reverse flow and pumping.

As seen in FIG. 1, compounding machine 14 includes at least one inlet hopper 16 configured to receive starting reagent virgin polyamide material 18 and feed the virgin polyamide material 18 into the rotating screw(s) (not shown) of compounding machine 14. In one aspect of the invention, virgin polyamide material 18 is a virgin polyamide material such as Nylon 6, Nylon 6,6 or Nylon 12.

In accordance with a first exemplary embodiment, virgin polyamide material 18 may be blended with a solid, strongly basic material 22 (e.g., a basic salt of a strong base) within compounding machine 14. As used throughout this specification, a strong base shall mean any compound whose 1 Molar aqueous solution has a pH greater than about 12. In one aspect, basic material 22 may be added to virgin polyamide material 18 prior to loading of compounding machine 14. In another aspect, basic material 22 may be added after loading of virgin polyamide material 18, such as via a second inlet hopper 24. Basic material 22 may be any suitable material, and in accordance with the present invention may be potassium tert-butoxide (KOtBu).

The virgin polyamide material 18 and basic material 22 are then blended and heated within compounding machine 14 until melting and advanced toward an outlet end 20 of compounding machine 14 by action of the rotating screw(s). As the blended mixture of materials 18/22 travels along the compounding machine, virgin polyamide material 18 becomes activated by removal of an amide hydrogen on the polyamide polymer backbone by the tBuO⁻ anion. The time and temperature of the reaction may be optimized depending upon the amount of the starting reagents, size and flow rate of the compounding machine. An activated polyamide material 26 may then be passed into a size reduction machine, such as a pelletizer 28, where activated polyamide material 26 is reduced to any desired size, and in one aspect to between about 5 and about 300 microns.

In one exemplary embodiment, the pelletized activated polyamide material 26 is then reloaded into compounding machine 14, or optionally into a second compounding machine 30. The pelletized activated polyamide material 26 may then be blended with a halogenated-dimethylalkylamine 32 within compounding machine 14, 30. Halogenated-dimethylalkylamine 32 may be any suitable material, and in accordance with the present invention may have a general chemical formula of $(CH_3)_2N-R-X$. R may be an alkyl containing 1-12 carbon atoms while X may be either chlorine or bromine. In one particular aspect, the halogenated-dimethylalkylamine is 2-chloro-N,N-dimethylethylamine. In one aspect, halogenated-dimethylalkylamine 32 may be added to pelletized activated polyamide material 26 prior to loading of compounding machine 14, 30. In another aspect, halogenated-dimethylalkylamine 32 may be added after loading of pelletized activated polyamide material 26, such as via a second inlet hopper 24, 34.

Activated polyamide material 26 and halogenated-dimethylalkylamine 32 are then blended and heated within the respective compounding machine 14, 30 until melting and advanced toward outlet end 20, 36 of compounding machine 14, 30 by action of the rotating screw(s). As the blended mixture of materials 26/32 travels along the compounding machine, the activated polyamide material 26 becomes functionalized by the dimethylalkylamine to produce an acid neutralizing polyamide 38.

Acid neutralizing polyamide 38 may then be further processed via a size reduction machine 40, such as forming acid neutralizing polyamide 38 into fibers for weaving into fabric material, pelletizing acid neutralizing polyamide 38 for mixing with other polymers or grinding or pulverizing acid neutralizing polyamide 38, such as via a cryogrinder, into a powder to serve as an additive.

Figure 2:
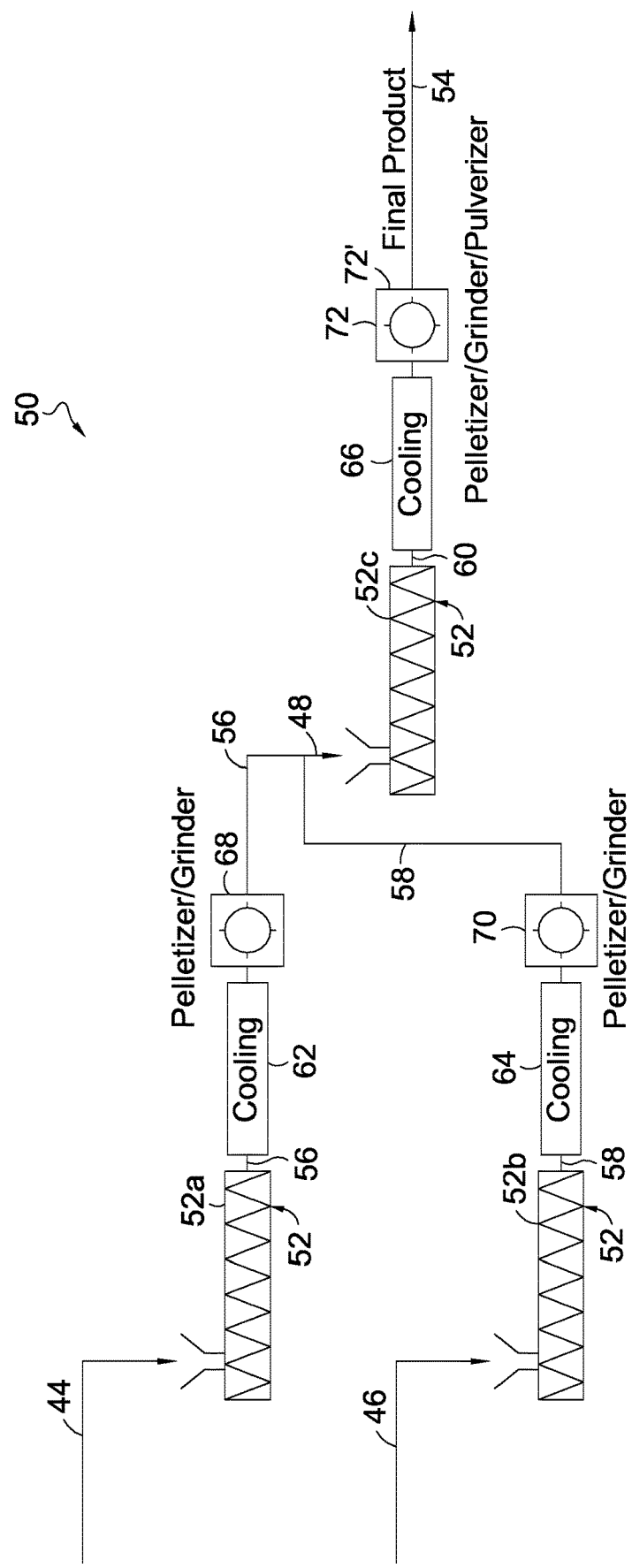
FIG. 2 is a schematic of an alternative exemplary system for producing acid neutralizing polyamide in accordance with the present invention.

With reference to FIG. 2, in an alternative embodiment of the present invention, a first reaction product 56 is produced by blending a first set of compounds 44 including amino nylon with a halogenated-dimethylalkylamine, such as but not limited to 2-chloro-N,N-dimethylethylamine hydrochloride, an acid neutralizing compound such as calcium carbonate and a heat stabilizing agent, such as but not limited to BRUGGOLEN H10 available from L. Brüggemann GmbH & Co. KG, Heilbronn, Germany, as shown in Reaction 1 set forth below. The calcium carbonate neutralizes (deprotonates) the quaternary amine of the 2-chloro-N,N-dimethylethylamine hydrochloride.

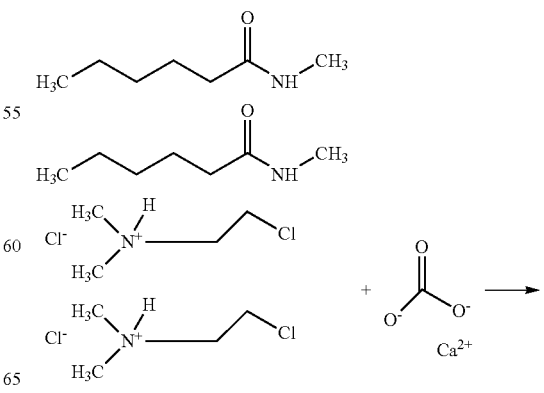

Reaction 1

-continued

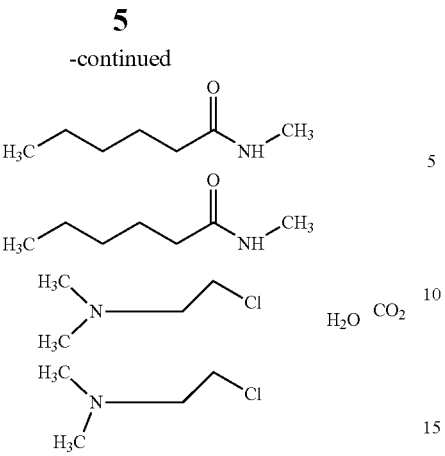

A second reaction product 58 is produced by blending a second set of compounds 46 including additional amino nylon with a strong base (pH>12), such as calcium hydroxide, and a heat stabilizing agent, such as but not limited to BRUGGOLEN H10 available from L. Brüggemann GmbH & Co. KG, Heilbronn, Germany as shown in Reaction 2 as set forth below. The hydroxide ions deprotonate the amide to generate a reactive nitrogen site on the nylon backbone.

Reaction 2

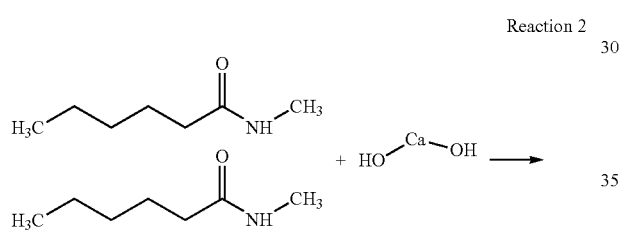

The acid neutralizing polymer product 54 is then prepared by reacting a third set of compounds 48 including the first reaction product 56 with the second reaction product 58 as shown in Reaction 3 set forth below.

Reaction 3

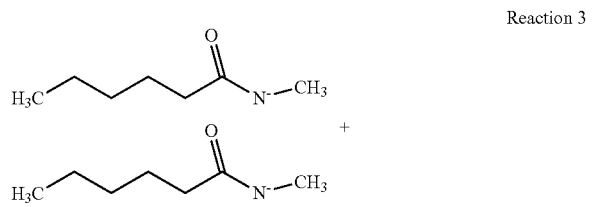

-continued

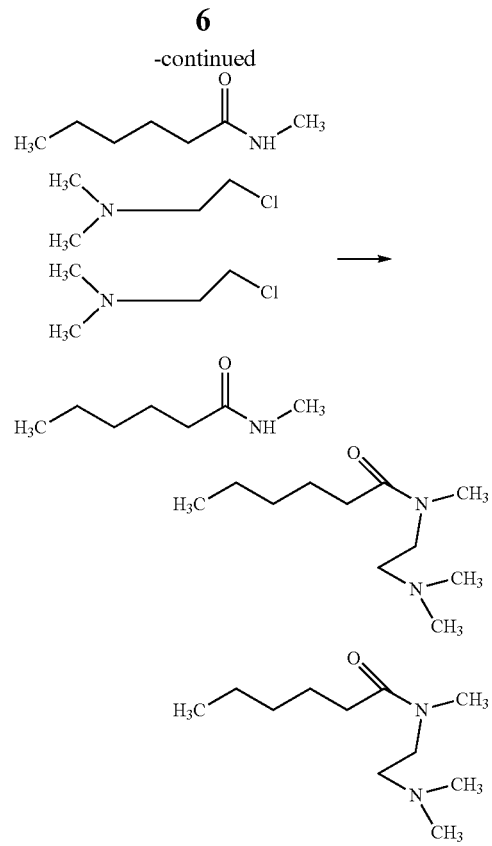

In one exemplary embodiment, the first and second reaction products 56, 58 each comprise a 50% molar fraction of the final product. As can been seen in Reactions 1-3, these process steps allow for less harmful wastes to be produced as the only byproducts are water and carbon dioxide. In addition, as calcium hydroxide is a polyprotic hydroxide base, less starting material is required which further reduces the environmental impact.

As shown in FIG. 2, a 3-pass manufacturing process 50 may use anywhere from 1 to 3 separate compounding machines 52a, 52b, 52c (generally compounding machine 52) in order to incorporate each reaction product to produce a final acid neutralizing polymer material 54. While any suitable reaction vessel may be used, in one exemplary embodiment, a twin screw extruder is used. As previously mentioned, the reaction can be realized in a suitable melt compounding process. One example is the method of twin-screw compounding as the process has significant flexibility to vary temperature, residence time and order of addition of ingredients. Twin screw extruders may be favorable reaction vessels as they melt the plastic, in this case, nylon, so that all the ingredients in this process can be reacted thoroughly. Reactive extrusion allows for the reaction to take place with the molten plastic acting as the solvent. The most important components in the extrusion process are heat, pressure, and the shear induced dispersion of the ingredients via the extruder, which in the exemplary embodiment described herein, is the twin screw. Without limiting thereto, twin screws may be favored for reactive extrusion because of their intimate shear induced dispersion.

In an exemplary embodiment described herein, the temperature of the compounding machine 52 must be maintained between about 194° C. to about 205° C. In addition, the screw speed must be maintained at no less than about 100 rpms in order to keep material moving throughout compounding machine 52. To ventilate the off-gas produced by the production process 50, at least one vent (not shown) is located on compounding machine 52 and may be set up with proper vacuum ventilation. Once each respective reaction product 56, 58, 60 is produced, each product 56, 58, 60 may be respectively cooled 62, 64, 66, such as by using, without limitation thereto, air or water. If air cooling is utilized, a conveyer belt (not shown) will be necessary.

In one aspect of the present invention, one or more cooling processes 62, 64, 66 may additionally or alternatively include passing each reaction product 56, 58, 60 through a basic buffer solution bath (such as but not limited to a solution pH of about 10) prior to size reduction, such as through respective size reduction machines 68, 70, 72 (e.g., pelletizing machines). Manufacturing process 50 may be able to create as little as a couple hundred grams, to as much as 2,000 kilograms, per hour of final acid neutralizing polymer material 54. In one exemplary embodiment, manufacturing process 50 produces respective reaction products 56, 58, 60 in the form of pellets having a mean particle size between about 2 and about 8 millimeters or chopped strands depending on the configuration of respective size reduction machines 68, 70, 72 at the end of each respective process step. Furthermore, by alternatively or additionally feeding final reaction product 60 into a pulverizing machine 72', acid neutralizing polymer product 54 can be size reduced into a micron scale powder which is useful for certain final article production processes. It should also be understood by those skilled in the art that other end product forms may be produced as desired.

In reactive extrusion, it is important to determine the molar fraction of each starting reagent necessary to achieve the best results. Experiments 1 to 6 below, different molar concentrations of reagents to be used in the full-scale process, from 10% to a maximum of 50%, were first evaluated using a small scale laboratory compounding machine. The CW BRABENDER prep mixer is a laboratory scale batch mixer where the melt mixing function is accomplished by two rotors within a closed mixing chamber. This technique allows for the temperature to be set, the residence time to be varied and the shear to be varied using a combination of a variable RPM and mixer chamber fill factor. This laboratory scale process was selected because it is a convenient method of carrying out multiple experiments and is capable of generating the key data required for the later transfer of the process to a larger scale device.

Experimental Procedure

1. Set CW BRABENDER mixer temperature to 195° C. and screw speed to 100 rpms.
2. Prepare reaction mixture 1 including nylon, heat stabilizing agent, 2-chloro-N,N-dimethylethylamine hydrochloride and calcium carbonate.
3. Gradually feed reaction mixture 1 into the CW BRABENDER mixer gradually. Pause periodically to push the mixture in with a push pin.
4. Grind reaction mixture 1 for a residence time of 3 minutes.
5. Turn the screw speed to zero and remove reaction product 1 from the CW BRABENDER mixer while the mixer is still hot.
6. Place reaction product 1 into a clean and dry vessel.
7. Clean the CW BRABENDER mixer of all excess material and reset the CW BRABENDER mixer screw speed to 100 rpms.
8. Prepare reaction mixture 2 including nylon, heat stabilizing agent and calcium hydroxide.
9. Gradually feed reaction mixture 2 into the CW BRABENDER mixer gradually. Pause periodically to push the mixture in with a push pin.
10. Grind reaction mixture 2 for a residence time of 3 minutes.
11. Turn the screw speed to zero and remove reaction product 2 from the CW BRABENDER mixer while the mixer is still hot.
12. Place reaction product 2 into a clean and dry vessel.
13. Clean the CW BRABENDER mixer of all excess material and reset the CW BRABENDER mixer screw speed to 100 rpms.
14. Feed 25 g of reaction product 1 and reaction product 2 directly into the CW BRABENDER mixer.
15. Let the mixture grind for a residence time of 3 minutes.
16. Turn the screw speed to zero and remove reaction product 3 from the CW BRABENDER mixer while the mixer is still hot.
17. Place reaction product 3 into a clean and dry vessel.

Experiment 1—10% Molar Fraction

Reaction mixture 1
  40 g nylon
  0.06 g heat stabilizing agent
  6 g 2-chloro-N,N-dimethylethylamine hydrochloride
  2 g calcium carbonate
Reaction mixture 2
  40 g nylon
  0.06 g heat stabilizing agent
  1.5 g calcium hydroxide Experiment 2—15% Molar Fraction Reaction mixture 1
  40 g nylon
  0.06 g heat stabilizing agent
  9 g 2-chloro-N,N-dimethylethylamine hydrochloride
  3 g calcium carbonate
Reaction mixture 2
  40 g nylon
  0.06 g heat stabilizing agent
  2.25 g calcium hydroxide Experiment 3—25% Molar Fraction Reaction mixture 1
  30 g nylon
  0.06 g heat stabilizing agent
  11 g 2-chloro-N,N-dimethylethylamine hydrochloride
  3.8 g calcium carbonate
Reaction mixture 2
  40 g nylon
  0.06 g heat stabilizing agent
  3.75 g calcium hydroxide Experiment 4—35% Molar Fraction Reaction mixture 1
  30 g nylon
  0.06 g heat stabilizing agent
  15.4 g 2-chloro-N,N-dimethylethylamine hydrochloride
  5.32 g calcium carbonate Reaction mixture 2
  40 g nylon
  0.06 g heat stabilizing agent
  5.25 g calcium hydroxide Experiment 5—45% Molar Fraction Reaction mixture 1
  30 g nylon
  0.06 g heat stabilizing agent
  19.8 g 2-chloro-N,N-dimethylethylamine hydrochloride
  6.84 g calcium carbonate
Reaction mixture 2
  40 g nylon
  0.06 g heat stabilizing agent
  6.75 g calcium hydroxide Experiment 6—50% Molar Fraction Reaction mixture 1
  30 g nylon
  0.06 g heat stabilizing agent
  22 g 2-chloro-N,N-dimethylethylamine hydrochloride
  7.6 g calcium carbonate
Reaction mixture 2
  40 g nylon
  0.06 g heat stabilizing agent
  7.5 g calcium hydroxide Experiment 7—Neutralization Test Procedure:
1. Calibrate the pH meter for pH 4 and pH 7.
2. Prepare pH 2 HCl solution.
3. Pour 20 ml of pH 2 HCL solution into 150 ml Erlenmeyer flask.
4. Record pH.
5. Add 10 g of the final product from Experiment 1 into the Erlenmeyer flask.
6. Stir thoroughly with the stir rod for about 1-2 minutes.
7. Record pH.
8. Repeat steps 1-7 with each of the final products from Experiment 2 to 6

Experimental results of Experiment 7 are displayed in FIG. 3 and Table 1 below which shows the relationship between molar fraction and acid neutralization.

TABLE 1

| Molar Fraction | Beginning pH | End pH | weight (g) | H+ |
| --- | --- | --- | --- | --- |
| 10% | 0.95 | 0.98 | 10.75 | 0.0074 |
| 15% | 0.92 | 1 | 10.86 | 0.0202 |
| 25% | 0.95 | 1.03 | 10.08 | 0.0189 |
| 35% | 0.98 | 1.1 | 10.38 | 0.0253 |
| 45% | 1.02 | 1.16 | 10.64 | 0.0263 |
| 50% | 1.05 | 1.26 | 10.61 | 0.0342 |

Figure 3:
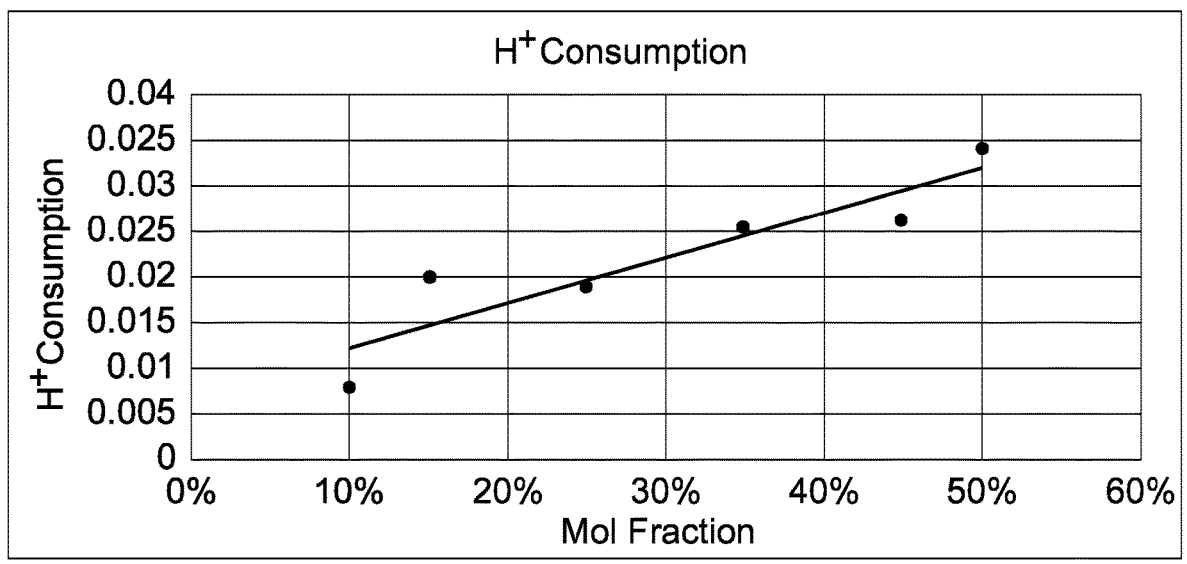
FIG. 3 is a graph of Table 1 showing the relationship between molar fraction and acid neutralization.

As can be seen in FIG. 3 and Table 1, as molar fraction increases, the acid neutralization also increases. As a result, 50% molar fraction was determined to be optimal.

The laboratory scale results form the basis of the process parameters for a scaled-up melt compounding process. For example, in the case of a twin-screw compounding extruder, the reaction information can be directly transferred, and the parameters of temperature, rpm and residence time form the basis of a Design of Experiments (DOE) approach. These variables are evaluated over a range of values according to a classic DOE experimental plan. A similar approach can be taken for the other melt compounding processes discussed earlier.

By way of example, in the specific case of a co-rotating twin-screw compounding extruder, a suitable machine would be one having a screw with a length to diameter (L:D) ratio in the range 40:1 to 75:1. The outputs of machines of this type are dependent on the screw diameter but can be in the range 25 lbs per hour up to 4000 lbs per hour for very large machines. At a full manufacturing scale, it is important to manage off gassing and cooling of the product. As aforementioned, water, buffer, or air cooling may be used. As product exits the die of the extruder, the product may be cooled using a pH 10 buffer bath, water, or air. The cooled product may then be sent to a pelletizer or directly into a pulverizer to create a powder. Additionally, more than one vent and/or filter may be required to control the quantity of carbon dioxide and water vapor that is produced as a byproduct during Reactions 1-3. This may be managed, however, through proper ventilation and filters.

From the above, it should be noted that each of the reactions may take place at any desired temperature, but preferably below the boiling point of the respective materials. Additionally, each reaction may also occur at any desired pressure within the compounding machine. Reaction times will thus depend upon the flow rate of the compounding machine, and the temperature and pressure of each reaction within the compounding machine.

Although the invention has been described with reference to preferred embodiments thereof, it is understood that various modifications may be made thereto without departing from the full spirit and scope of the invention as defined by the claims which follow.

What is claimed is:
1. A method of making an acid neutralizing polymer material, comprising:
   a) preparing a first reaction mixture comprising a blend of a first amount of a polyamide material and a quaternary amine salt of a halogenated-dimethylalkylamine having a general chemical formula of $(CH_3)_2N-R-X$, wherein R is an alkyl containing 1-12 carbon atoms and X is either chlorine or bromine;
   b) adding the first reaction mixture to a first compounding machine;
   c) reacting the first reaction mixture for a time and at a temperature sufficient to produce a first reaction product comprising a deprotonated halogenated-dimethylalkylamine;
   d) preparing a second reaction mixture comprising a second amount of the polyamide material and a solid, strongly basic material;
   e) adding the second reaction mixture to a second compounding machine;
   f) reacting the second reaction mixture for a time and at a temperature sufficient to produce a second reaction product comprising a an activated polyamide material;
   g) preparing a third reaction mixture comprising a blend of the first reaction product and the second reaction product;
   h) adding the third reaction mixture to a third compounding machine; and
   i) reacting the third reaction mixture for a time and at a temperature sufficient to produce the acid neutralizing polymer material.

2. The method of claim 1 further comprising:
j) cooling each of the first reaction product, second reaction product and third reaction product in respective cooling machines.

3. The method of claim 2 further comprising:
k) reducing a particle size of each of the cooled first reaction product, the cooled second reaction product and the cooled third reaction product in respective size reduction machines.

4. The method of claim 3 wherein the cooled first reaction product and the cooled second reaction product are size reduced prior to step (g).

5. The method of claim 1 wherein one or both of the first reaction mixture and the second reaction mixture further comprise a heat stabilizing agent.

6. The method of claim 1 wherein the first reaction mixture further comprises an acid neutralizing compound.

7. The method of claim 2 wherein each of the respective cooling machines comprises a pH 10 basic buffer solution bath.

8. The method of claim 1 wherein the polyamide material comprises nylon 6, nylon 66 or nylon 12.

9. The method of claim 1 wherein the strongly basic material is potassium tert-butoxide (KOtBu) or calcium hydroxide (Ca(OH)$_2$).

10. The method of claim 1 wherein the halogenated-dimethylalkylamine is 2-chloro-N,N-dimethylethylamine.

11. The method of claim 1 wherein the first, second and third compounding machines each comprises one or more twin screw extruders.

12. The method of claim 1 wherein the first, second and third compounding machines are a single compounding machine.

13. The method of claim 1 wherein the temperature of the first, second and third compounding machines is between about 194° C. and about 205° C.

14. The method of claim 3 wherein each of the cooled first reaction product and the cooled second reaction product is sized reduced by pelletizing to a mean particle size of between about 2 and about 8 millimeters.

15. The method of claim 3 wherein the cooled third reaction product is sized reduced through one or more of the steps of:
i) forming the cooled third reaction product into fibers for weaving into fabric material;
ii) pelletizing the cooled third reaction product for mixing with other polymers; or
iii) pulverizing the cooled third reaction product into a powder.

16. The method of claim 15 wherein the sized reduced third reaction product is incorporated with a floor mat.

* * * * *